(No Model.)
R. H. HICK.
GARDEN PLOW.
No. 558,492. Patented Apr. 21, 1896.
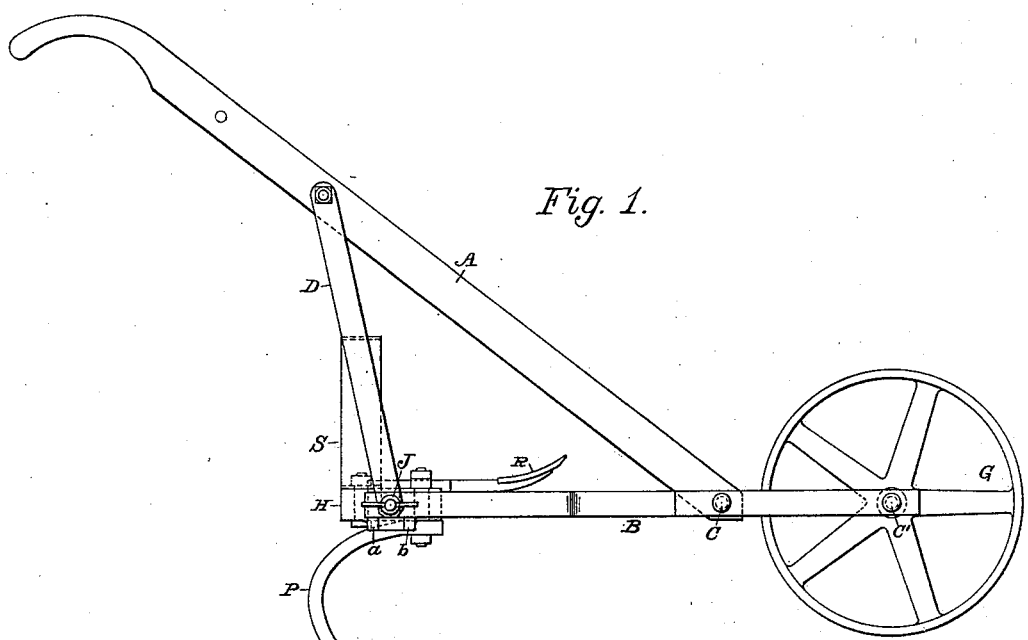
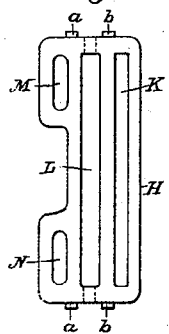
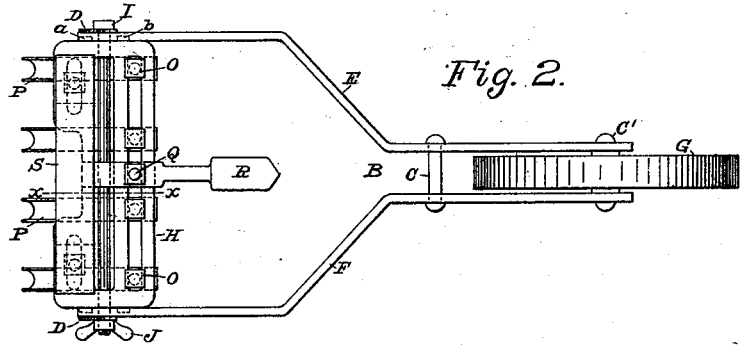
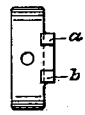
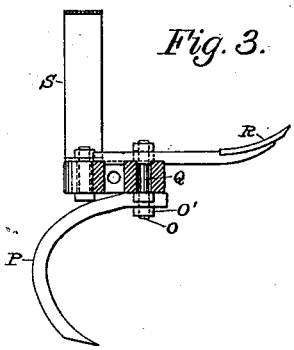
WITNESSES
L. G. Hopper
J. M. Larimer
INVENTOR
Robert H. Hick.
BY
Toulmin & Wittemore
ATTORNEYS.

UNITED STATES PATENT OFFICE.

ROBERT H. HICK, OF BURTON, OHIO, ASSIGNOR OF ONE-HALF TO THE BURTON HANDLE COMPANY, OF SAME PLACE.

GARDEN-PLOW.

SPECIFICATION forming part of Letters Patent No. 558,492, dated April 21, 1896.

Application filed January 10, 1896. Serial No. 574,937. (No model.)

*To all whom it may concern:*

Be it known that I, ROBERT H. HICK, a citizen of the United States, residing at Burton, in the county of Geauga and State of Ohio, have invented certain new and useful Improvements in Garden-Cultivators, of which the following is a specification, reference being had therein to the accompanying drawings.

The invention relates to that particular class of cultivators known as "garden hand-cultivators."

The object of this invention is to produce a machine that will carry, ready for use, a number of shovels or blades of various types secured to the cultivator, and so arranged and constructed that any particular style of shovel or number of shovels can be selected and adjusted for instant use quickly and without the necessity and trouble of substituting one type for another by means of wrenches, as is commonly done at the present time.

A further object of this peculiar construction is to provide against the loss of such shovels or teeth which usually occurs when said implements are detached from the machine and laid aside while others are being used.

To this end my invention consists, briefly, in a hand-cultivator comprising a frame, a transporting-wheel journaled in the forward part of said frame, a revoluble tooth or shovel carrying body or gang pivotally secured in the frame rearwardly of the wheel, and means for holding said gang or body in any desired position, whereby any particular style of tooth or shovel can be used.

The invention further consists in the construction of the tooth-supporting body or gang and in the manner in which the teeth or shovels are adjustably secured thereto.

The invention still further consists in the peculiar construction, arrangement, and combination of the various parts, all as more fully hereinafter described, and shown in the drawings, in which—

Figure 1 is a side elevation of the cultivator. Fig. 2 is a plan view thereof with the handles removed. Fig. 3 is a cross-section on line *x x*, Fig. 2, illustrating the manner in which the teeth are secured to the body portion. Fig. 4 is a detached plan view of the body or gang with the teeth removed, and Fig. 5 is an end elevation thereof.

In Fig. 1, A represents the usual handles employed in cultivators of this kind, secured to the frame B at their forward ends by the bolt C and at their free ends by means of braces D. The frame B, I preferably construct of two side bars E and F, which are secured to each other by means of the bolts C and C', the latter of which bolts forms a shaft carrying the transporting-wheel G. The free ends of this frame extend obliquely and rearwardly, as plainly shown in Fig. 2, and are adapted to support between them the body H, which is pivotally secured by means of a bolt I, passing through the arms and the body H and provided with a winged nut J. On the ends of the body portion are extensions or lugs *a* and *b*, which lugs are adapted to engage with the arms of the frame when the body is clamped, by means of the winged nut, in its desired position, thereby preventing any oscillation of the body portion when the cultivator is in use.

I preferably construct the braces D so that they overlap the rearwardly-extending arms E and F at their free ends, which allows the bolt I to pass through said braces and arms, also the body portion, thus producing a simple, compact, and effective frame.

The body H is provided with the longitudinal slots K and L and two similar and smaller slots M and N.

O are bolts passing through slot K and through the teeth P, provided with the usual securing-nut O'. Q is a similar bolt passing through the same slot, but in a direction opposite to that of bolt O, and secures to the gang-body the shovel R. At right angles to this shovel and opposite to the teeth P is a shovel or scraper S, which is secured to the body portion by means of bolts passing through the smaller slots M and N.

It can be easily seen by this peculiar construction that the teeth or shovels can be adjusted longitudinally to any desired extent, and that various types of shovels can be used which at all times are secured to the cultivator and capable of immediate use.

The operator, desiring to cultivate with the teeth P, adjusts the gang or body portion H as shown in Fig. 1. If the single plow-point is desired to be used, the operator is simply required to unloosen the winged nut J, withdraw the lugs $a$ and $b$ from beneath the arms E and F, revolve the gang forwardly a quarter of a revolution, and again tighten the winged nut. The lugs in this case will be above and below the arms and will prevent any further rotation of the gang.

Having thus described my invention, what I claim, and desire to secure by Letters Patent, is—

1. In a cultivator of the kind described, the combination with the frame having rearwardly-extending arms, a transporting-wheel journaled in the forward part of the frame, a revoluble tooth-supporting body or gang pivotally secured between the arms, and extensions or lugs on said body adapted to engage with the frame, substantially as and for the purpose described.

2. In combination with the cultivator-frame, and a transporting-wheel journaled therein, of a revoluble tooth-supporting body or gang pivotally secured in the rear of the frame; said gang comprising a slotted body portion, numerous shovels or blades of different type adjustably secured to said body portion as and for the purpose described, and extensions or lugs on the end of the body adapted to engage with the cultivator-frame, substantially as described.

In testimony whereof I affix my signature in presence of two witnesses.

ROBERT H. HICK.

Witnesses:
W. R. HARPER,
WILFRED W. BLAIR.